United States Patent [19]

Bumb

[11] B 3,984,318

[45] Oct. 5, 1976

[54] LIQUID FILTER VALVE MEANS

[75] Inventor: Louis A. Bumb, Toledo, Ohio

[73] Assignee: General Motors Corporation, Detroit, Mich.

[22] Filed: Dec. 16, 1974

[21] Appl. No.: 532,901

[44] Published under the second Trial Voluntary Protest Program on January 13, 1976 as document No. B 532,901.

[52] U.S. Cl. .............................. 210/130; 210/136
[51] Int. Cl.² .................................... B01D 35/14
[58] Field of Search ............. 210/130, DIG. 17, 136

[56] References Cited
UNITED STATES PATENTS

| | | | |
|---|---|---|---|
| 3,083,832 | 4/1963 | Hathaway et al. | 210/DIG. 17 |
| 3,231,089 | 1/1966 | Thornton | 210/130 |
| 3,262,567 | 7/1966 | Pall et al. | 210/130 |
| 3,332,554 | 7/1967 | Humbert, Jr. | 210/DIG. 17 |

Primary Examiner—Frank A. Spear, Jr.
Attorney, Agent, or Firm—R. L. Phillips

[57] ABSTRACT

An oil filter having a Belleville spring bypass valve mounted together with a rubber anti-drainback valve on a two-piece sheet metal filter cartridge support to form a subassembly which can readily be assembled in the oil filter canister and wherein the support member in addition to supporting a filter cartridge in the canister also provides a bypass passageway and valve seat for the bypass valve.

3 Claims, 2 Drawing Figures

LIQUID FILTER VALVE MEANS

This invention relates to liquid filters and more particularly to an oil filter having a subassembled anti-drainback valve, bypass valve, and filter cartridge support member arrangement therefor.

In the prior art of liquid filters such as an engine oil filter having provisions for preventing drainback and also permitting bypass, it is common practice to use a rubber valve element to prevent drainback and a poppet valve biased by a coil spring to permit bypass flow at a predetermined pressure differential setting as is shown in U.S. Pat. No. 3,036,711. In attempting to simplify such arrangement it is also known to use a one-piece element that integrates both the valves as shown in U.S. Pat. No. 3,231,089. Nevertheless, there still remains a need for an even simpler arrangement requiring few if any special attendant parts that must be fit together at final assembly and also as arrangement that is easy to calibrate and hold to close manufacturing tolerances while possessing a high degree of reliability and relative insensitivity to distortion where a rubber or elastomeric valve member is used.

To best serve the different needs of preventing drainback and permitting bypass flow above a predetermined pressure drop across the filter, it has been found that while a rubber valve element is entirely suitable to prevent drainback, a different type of valve in the form of a metal Belleville spring is very well suited to the task of controlling bypass flow. Furthermore, it has been found that such a bypass valve together with a simple rubber anti-drainback valve can all be mounted on a two-piece sheet metal filter cartridge support member specially designed for that purpose with the support member continuing to provide filter cartridge support and also providing both a bypass flow passageway and valve seat for the Belleville spring bypass valve. This results in an easy to calibrate, very durable and easy to manufacture arrangement that can be readily installed as a subassembly rather than in piece-meal fashion.

An object of the present invention is to provide a new and improved liquid filter with an anti-drainback valve, bypass valve and filter cartridge support member subassembly.

Another object is to provide a rubber or elastomeric anti-drainback valve and Belleville spring bypass valve which are both mounted on a filter cartridge support to then assemble as a unit in a canister.

Another object is to provide in a liquid filter a rubber or elastomeric anti-drainback valve and a Belleville spring bypass valve which are both mounted on a simple two-piece filter cartridge support that also provides a bypass passageway and a valve seat for the bypass valve and with this arrangement forming a subassembly which is assembled as a unit in a canister after insertion of the filter cartridge.

These and other objects of the present invention will be more apparent from the following description and drawing in which.

Figure 1:
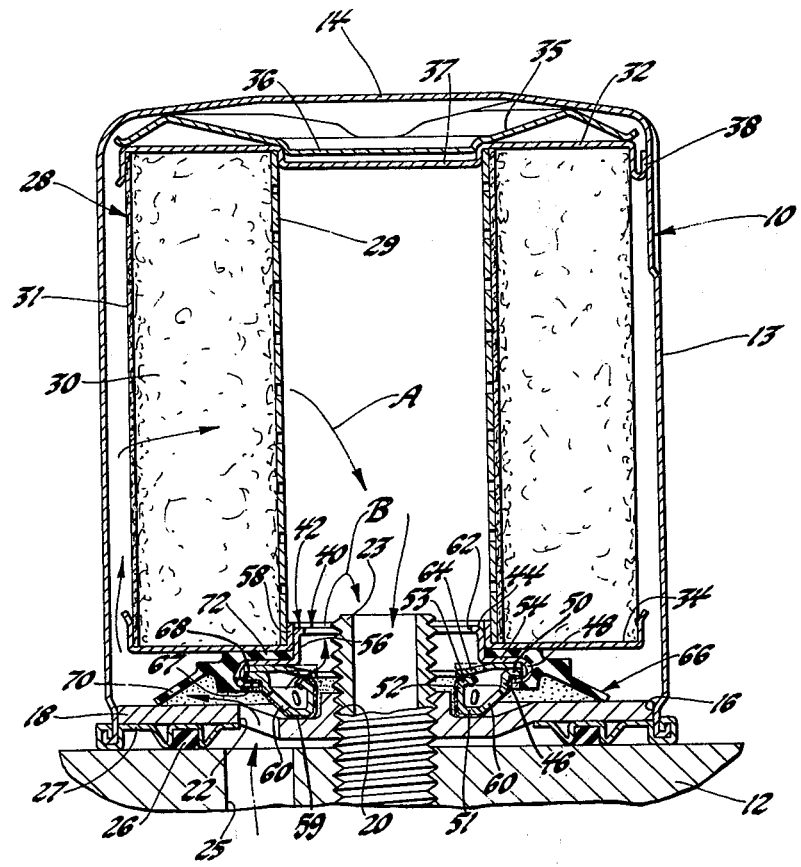
FIG. 1 is a side view with parts in section of an engine oil filter having an anti-drainback valve, bypass valve and filter cartridge support arrangement according to the present invention.

Referring to FIG. 1, there is shown an oil filter 10 for filtering the oil used in an engine 12. The filter comprises a cylindrical canister 13 having a closed end 14 and an open end 16. The open end is closed by a closure plate 18 having a central fluid outlet 20 and a plurality of fluid inlets 22 that are circularly arranged around the outlet. The outlet 20 is threaded to engage a return pipe 23 extending from the engine 12 while the inlets 22 are open to a filter feed passage 25 in the engine radially inward of a gasket 26. The gasket 26 is mounted on a separate plate 27 whose outer periphery is rolled over together with the open end of the canister 13 to be thereby secured to the canister and also support the closure plate 18. A filter cartridge 28 is positioned in canister 13 and includes a perforated tube 29 that is surrounded by a suitable filter element 30 of the pleated paper type. The outer envelope 31 of the filter cartridge is spaced radially inward from the canister 13 so that oil entering through the inlets 22 may flow to the outside of the cartridge and then inwardly through the filter element 30 into the tube 29 and thence to the return pipe 23 as shown by the arrows A. The filter cartridge further includes cover plates 32 and 34 which fit over and are sealed to the opposite ends of the filter element 30 to provide support therefor as well as provision for holding the cartridge in position. A spring member 35 which seats on the closed canister end 14 has a central closed end tubular projection 36 which fits in a similar projection 37 on the cover plate that in turn fits into the upper end of tube 29 to thereby hold the spring in place while tabs 38 located about the periphery of the upper cover plate 32 engage the canister 13 to provide radial location of this arrangement of parts. The spring 35 biases the filter cartridge 28 downwardly against a subassembly 40 constructed according to the present invention arranged about the outlet 20 and return pipe 23 and between the closure plate 18 and the lower cover plate 34.

Figure 2:
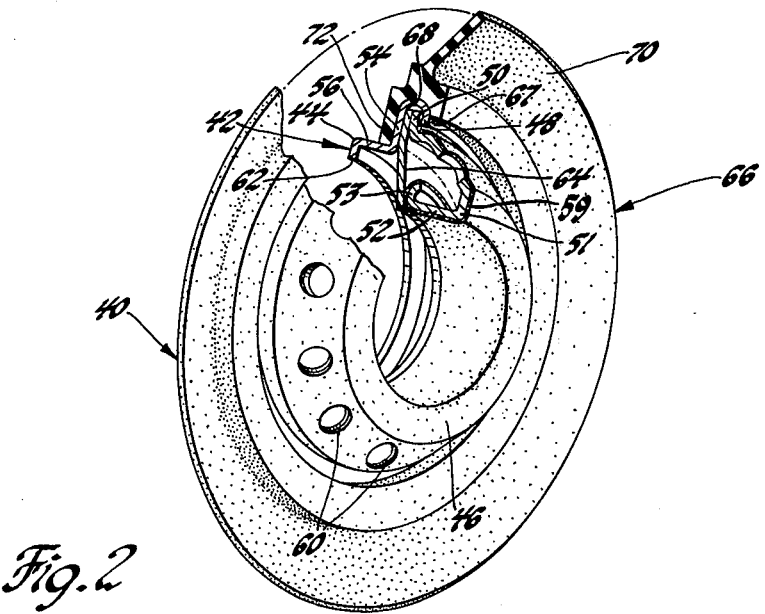
FIG. 2 is an enlarged perspective view with parts broken away of the anti-drainback valve, bypass valve and filter cartridge support arrangement in FIG. 1.

As shown in FIGS. 1 and 2, the subassembly 40 comprises a two-piece sheet metal support 42 consisting of a pair of collars 44 and 46 which are joined by rolling a radial annular flange 48 on one end of the upper collar 44 over a radial annular flange 50 on one end of the lower collar 46. The lower collar 46 has an annular radially extending base 51 that seats on the support plate 18 about the outlet 20 and return pipe 23 and radially inward of the inlets 22 and there is provided a tubular portion 52 depending from the base that extends upward and is rolled over at its upper open end to provide an annular lip 53 which serves as a valve seat for the bypass valve as described in more detail later. The flange 54 on the upper collar 44 provides support for the filter cartridge's lower cover plate 34 adjacent the inner diameter thereof and a tubular portion 56 extends upward from the inner diameter of the flange to closely fit in an inner collar 58 on the lower closure plate 34 whereby the filter cartridge is also radially located at its lower end. In addition, the lower collar 46 is provided with a vinyl coating 59 on one side to provide good sealing both where it seats at its base 51 on support plate 18 and at its valve seat 53.

Describing now the valve structures, the lower collar 46 is provided with circularly arranged apertures 60 which are open to the inlets 22 while the upper collar 44 is provided with an annular opening 62 about the return pipe 23 to thereby provide for a bypass passage through this assembly from the engine filter feed passage 25 to the return pipe 23 parallel or in bypass relation with the filter element 30. Flow through this bypass is controlled by a simple metal Belleville spring 64 whose outer periphery is clamped between the collar flanges 48 and 50 and is preloaded during assembly to engage about its inner periphery with the valve seat 53 provided on the lower collar 46 to thereby normally close the bypass while being acted on by the pressure differential across the filter cartridge 28. In addition, there is a rubber anti-drainback valve 66 which also has an annular shape and is secured to the support 42. The valve 66 has an inner flange 67 which stretches over the rolled collar flange 48 to permit the latter to be received in a circular groove 68 in the interior of the anti-drainback valve while an annular free-ended conical section 70 at its outer periphery engages within the elastic limits of this member with the closure plate 18 radially outward of the inlets 22 to thereby provide a seal between the inlets 22 and the interior of the canister. The anti-drainback valve 66 further includes a radially extending annular wall 72 that is clamped between the annular flange 54 of the upper collar 44 and a radially inward portion of the lower closure plate 34 of the filter cartridge to thus provide sealing at this joint in addition to firm holding of the valve.

Describing now a typical operation with such an arrangement, with the engine running and oil delivered to the filter feed passage 25, only a small pressure differential is required to deflect the anti-drainback valve section 70 away from the closure plate 18 whereby oil then passes through the inlets 22 and then through the filter cartridge 28 to be returned to the engine through the return pipe 23 as shown by arrows A. So long as there is not an excessive accummulation of foreign material in the cartridge 28, the pressure differential or drop thereacross remains low and the preload in the Belleville spring bypass valve 64 is sufficient to maintain it in the closed position against the filter feed pressure it experiences through the bypass inlets 60. However, when the foreign material accummulation becomes excessive the Belleville spring member 64 then lifts off its valve seat as shown in dash-line to permit oil to then flow from the inlets 22 through the bypass passage directly to the return pipe 23 as shown by arrows B thus bypassing the filter cartridge above the predetermined pressure differential. When the engine is shut down the anti-drainback valve 70 will again close and the bypass valve 64 if it was open will also close to thus prevent oil from draining from the oil filter back into the engine so that the volume of the oil filter need not be completely filled before full oil pressure can be developed on a subsequent engine start.

Thus, the operations of anti-drainback, bypass and filter cartridge support are provided by one subassembly which has relatively few parts and is easily made as a subassembly or unit that readily fits in the open end of the canister after insertion of the oil filter cartridge and immediately before assembly of the closure plate. There is thus no piece-meal assembly of either the anti-drainback valve, bypass valve or cartridge support for the oil filter. Furthermore, the Belleville spring bypass valve is a very simple and durable device that is easy to calibrate and assemble in the subassembly as is the rubber anti-drainback valve whose acting pressure load is far less. In addition, the simple and accurate location of the anti-drainback valve and bypass valve on the same support is of great advantage in mass production.

The above described embodiment is illustrative of the invention which may be modified within the scope of the appended claims.

I claim:
1. A liquid filter comprising a canister having an open end, a filter cartridge inserted through said open end into said canister, a closure member closing said open end of said canister having an inlet for delivering liquid to said filter cartridge and an outlet for receiving filtered liquid from said filter cartridge, and a subassembly mounted as a unit in said canister between said filter cartridge and said closure member just prior to assembly of said closure member comprising a pair of joined collars for supporting said filter cartridge in proper position in said canister relative to said inlet and said outlet, said collars having a bypass passage therein between said inlet and said outlet bypassing said filter cartridge, one of said collars further having a bypass valve seat in said bypass passage, an annular metal spring bypass valve member clamped between said collars for normally seating on said bypass valve seat to close said bypass passage below a predetermined pressure differential across said filter cartridge and lifting off said bypass valve seat above said predetermined pressure differential to open said bypass passage to bypass liquid from said inlet past said filter cartridge directly to said outlet, and a rubber or rubberlike anti-drainback valve member mounted on said collars and seating on said closure member to prevent liquid in said canister from draining to said outlet in the absence of pressure at said inlet and lifting off of said closure member in response to pressure build-up at said inlet to permit flow from said inlet to said filter cartridge during normal flow operation.

2. A liquid filter comprising a canister having an open end, a filter cartridge inserted through said open end into said canister, a closure member closing said open end of said canister having an off-center inlet for delivering liquid to the exterior of said filter cartridge and a central outlet for receiving filtered liquid from interior of said filter cartridge, and a subassembly mounted as a unit in said canister between said filter cartridge and said closure member just prior to assembly of said closure member comprising a pair of joined collars arranged about said outlet for supporting said filter cartridge in proper position in said canister relative to said inlet and said outlet, said collars having an annular bypass passage therein between said inlet and said outlet bypassing said filter cartridge, one of said collars further having an annular bypass valve seat in said bypass passage, an annular Belleville spring bypass valve member clamped between said collars for normally seating on said bypass valve seat to close said bypass passage below a predetermined pressure differential across said filter cartridge and lifting off said bypass valve seat above said predetermined pressure differential to open said bypass passage to bypass liquid from said inlet past said filter cartridge directly to said outlet, and an annular rubber or rubberlike anti-drainback valve member mounted on said collars and seating on said closure member outward of said inlet to prevent liquid in said canister from draining to said outlet in the absense of pressure at said inlet and lifting off of said closure member in response to pressure build-up at said inlet to permit flow from said inlet to said filter cartridge during normal flow operation.

3. A liquid filter comprising a canister having an open end, a filter cartridge inserted through said open end into said canister, a closure member closing said open end of said canister having an off-center inlet for delivering liquid to the exterior of said filter cartridge and a central outlet for receiving filtered liquid from interior of said filter cartridge, and a subassembly mounted as a unit in said canister between said filter cartridge and said closure member just prior to assembly of said closure member comprising a pair of joined collars arranged about said outlet for supporting said filter cartridge in proper position in said canister relative to said inlet and said outlet, said collars having an annular bypass passage therein between said inlet and said outlet bypassing said filter cartridge, one of said collars further having an annular bypass valve seat in said bypass passage, an annular Belleville spring bypass valve member clamped at an outer periphery between said collars for normally seating adjacent an inner periphery on said bypass valve seat to close said bypass passage below a predetermined pressure differential across said filter cartridge and lifting off said bypass valve seat above said predetermined pressure differential to open said bypass passage to bypass liquid from said inlet past said filter cartridge directly to said outlet, and an annular rubber or rubberlike anti-drainback valve member mounted at an inner periphery on an outer periphery of one of said collars and seating at an outer periphery on said closure member outward of said inlet to prevent liquid in said canister from draining to said outlet in the absence of pressure at said inlet and lifting off of said closure member in response to pressure build-up at said inlet to permit flow from said inlet to said filter cartridge during normal flow operation.

* * * * *